United States Patent [19]

East et al.

[11] 4,330,457

[45] May 18, 1982

[54] POLY(ESTER-AMIDE) CAPABLE OF FORMING AN ANISOTROPIC MELT PHASE DERIVED FROM 6-HYDROXY-2-NAPHTHOIC ACID, DICARBOXYLIC ACID, AND AROMATIC MONOMER CAPABLE OF FORMING AN AMIDE LINKAGE

[75] Inventors: Anthony J. East, Madison; Larry F. Charbonneau, Chatham; Gordon W. Calundann, North Plainfield, all of N.J.

[73] Assignee: Celanese Corporation, New York, N.Y.

[21] Appl. No.: 214,557

[22] Filed: Dec. 9, 1980

[51] Int. Cl.³ .................... C08K 3/40; C08G 69/02; C08G 69/12
[52] U.S. Cl. .................. 524/602; 528/183; 528/190; 528/271; 528/288
[58] Field of Search ............... 528/183, 288, 190, 271; 260/37 N

[56] References Cited

U.S. PATENT DOCUMENTS

| | | | |
|---|---|---|---|
| 3,809,679 | 5/1974 | Lenz et al. | 260/30.2 |
| 3,859,251 | 1/1975 | Kuhfuss et al. | 260/40 R |
| 4,067,852 | 1/1978 | Calundann | 260/7.5 |
| 4,182,842 | 1/1980 | Jackson et al. | 528/292 |
| 4,219,461 | 8/1980 | Calundann | 528/173 |
| 4,238,598 | 12/1980 | Farstritsky | 528/193 |
| 4,238,599 | 12/1980 | Langley et al. | 528/193 |
| 4,256,624 | 3/1981 | Calundann | 528/173 |
| 4,267,304 | 5/1981 | Foasey et al. | 528/190 |

OTHER PUBLICATIONS

European Patent Application, 0007715, (Publication No.), ICI, Feb. 6, 1980.

Primary Examiner—H. S. Cockeram
Attorney, Agent, or Firm—Charles B. Barris

[57] ABSTRACT

A melt processable poly(ester-amide) which is capable of forming an anisotropic melt phase is provided. The poly(ester-amide) of the present invention consists essentially of the recurring units (a) 6-oxy-2-naphthoyl moiety, (b) aryl dicarboxyl moiety or trans-1,4-dicarboxycyclohexane moiety, (c) an aromatic moiety capable of forming an amide linkage in the polymer, and (d) optionally, dioxyaryl moiety in the proportions indicated. Preferably, the aromatic moiety capable of forming an amide linkage is p-aminophenol or p-phenylenediamine. The resulting poly(ester-amide) exhibits a melting temperature below approximately 400° C., preferably below approximately 350° C. The poly(ester-amide) of the present invention is preferably formed by a melt polymerization technique.

17 Claims, No Drawings

POLY(ESTER-AMIDE) CAPABLE OF FORMING AN ANISOTROPIC MELT PHASE DERIVED FROM 6-HYDROXY-2-NAPHTHOIC ACID, DICARBOXYLIC ACID, AND AROMATIC MONOMER CAPABLE OF FORMING AN AMIDE LINKAGE

BACKGROUND OF THE INVENTION

The use of objects molded from synthetic polymers has expanded rapidly in the last several decades. In particular, polyesters and polyamides have widely gained acceptance for general molding applications and in the formation of fibers and films. An additional class of polymers known as poly(esteramides) has been disclosed. Such disclosures include U.S. Pat. Nos. 2,547,113; 2,946,769; 3,272,774; 3,272,776; 3,440,218; 3,475,385; 3,538,058; 3,546,178; 3,575,928; 3,676,291; 3,865,792; 3,926,923; and 4,116,943. Polyimide esters are disclosed in German Offenlegungsschrift No. 2,950,939 and in U.S. Pat. No. 4,176,223.

Although many polyesters, polyamides, and poly(esteramides) have mechanical properties suitable for general applications, most polyesters, polyamides, and poly(ester-amides) are not suitable for high strength service because the mechanical properties are not sufficiently high. One group of polymers that is suitable for high strength service without the use of a reinforcing agent is a new class of polymers exhibiting a general overall balance of mechanical properties substantially enhanced over previous polymers. These polymers have been described by various terms, including "liquid crystalline", "liquid crystal", and "anisotropic". Briefly, the polymers of this new class are thought to involve a parallel ordering of the molecular chains. The state wherein the molecules are so ordered is often referred to either as the liquid crystal state or the nematic phase of the liquid crystal state. These polymers are prepared from monomers which are generally long, flat, and fairly rigid along the long axis of the molecule and commonly have chain extending linkages that are either coaxial or parallel.

Disclosures of polyesters which exhibit melt anisotropy include (a) *Polyester X7G-A Self Reinforced Thermoplastic*, by W. J. Jackson Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 828,935 and 828,936, (c) Dutch Pat. No. 7505551, (d) West German Pat. Nos. 2520819, 2520820, 2722120, 2834535, 2834536, and 2834537, (e) Japanese Pat. Nos. 43-223; 2132-116; 3017-692; and 3021-239, (f) U.S. Pat. Nos. 3,991,013; 3,991,014; 4,057,597; 4,066,620; 4,067,852; 4,075,262; 4,083,829; 4,118,372; 4,130,545; 4,130,702; 4,156,070; 4,159,365; 4,161,470; 4,169,933; 4,181,792; and 4,184,996; and (b) U.K. Application No. 2,002,404. See also commonly assigned U.S. Ser. Nos. 10,392, filed Feb. 8, 1979; (now U.S. Pat. No. 4,238,599) 10,393, filed Feb. 8, 1979; (now U.S. Pat. No. 4,238,598) 32,086, filed Apr. 23, 1979; (now U.S. Pat. No. 4,219,461) and 54,049, filed July 2, 1979 (now U.S. Pat. No. 4,256,624).

Disclosures of liquid crystalline polyamide dopes include U.S. Pat. Nos. 3,673,143; 3,748,299; 3,767,756; 3,801,528; 3,804,791; 3,817,941; 3,819,587; 3,827,998; 3,836,498; 4,016,236; 4,018,735; 4,148,774; and Re.30,352.

U.S. Pat. No. 4,182,842 discloses poly(ester-amides) prepared from an aromatic dicarboxylic acid, ethylene glycol, and a p-acylaminobenzoic acid. This patent neither discloses nor suggests the poly(ester-amide) of the present invention. A similar disclosure is Japan 54 125271.

European Patent Application No. 79301276.6 (Publication No. 0 007 715) discloses melt processable fiber-forming poly(ester-amides) comprising residues of one or more aminophenols selected from p-aminophenol and p-N-methylaminophenol and residues of one or more dicarboxylic acids. The poly(ester-amide) contains a balance of linear difunctional residues and dissymmetric difunctional residues derived from either the aminophenols or the acids. The linear difunctional residues and dissymmetric difunctional residues are chosen so as to give a product which melts below its decomposition temperature and exhibits optical anisotropy in the melt. This patent neither discloses nor suggests the poly(ester-amide) of the present invention which contains a 6-oxy-2-naphthoyl moiety.

U.S. Pat. No. 3,859,251 discloses a poly(ester-amide) which comprises 50 to 100 mole percent of the moiety derived from an acyclic aliphatic dicarboxylic acid. Such a moiety is excluded from the poly(ester-amide) of the present invention. Moreover, while the patent discloses the inclusion of a p-oxybenzoyl moiety, there is no disclosure nor suggestion of the usefulness of a poly(ester-amide) containing a 6-oxy-2-naphthoyl moiety, such as that of the present invention.

U.S. Pat. No. 3,809,679 discloses poly(ester-amides) consisting of 10 to 90 mole percent of recurring structural units derived from a dicarboxylic acid dihalide and a dihydroxy compound of a specified formula and 10 to 90 mole percent of recurring structual units derived from a dicarboxylic acid dihalide and a diamino compound of a specified formula. The poly(ester-amides) specifically exclude moieties derived from aromatic hydroxyacids, such as the 6-oxy-2-naphthoyl moiety included in the poly(ester-amide) of the present invention. Furthermore, most, if not all, of the poly(ester-amides) disclosed are not readily melt processable, and there is no disclosure of the existence of an anisotropic melt phase.

Therefore, it is an object of the present invention to provide an improved poly(ester-amide) which is suited for the formation of quality molded articles, melt extruded fibers, and melt extruded films.

It is also an object of the present invention to provide an improved poly(ester-amide) which forms a highly tractable melt phase.

It is also an object of the present invention to provide an improved poly(ester-amide) which forms an anisotropic melt phase at a temperature well below its decomposition temperature and which may form quality fibers, films, and molded articles.

It is also an object of the present invention to provide an improved melt processable poly(ester-amide) capable of forming an anisotropic melt phase at a temperature below approximately 400° C., and preferably below approximately 350° C.

It is also an object of the present invention to provide an improved melt processable poly(ester-amide) which exhibits improved adhesion, improved fatigue resistance, and increased transverse strength.

These and other objects, as well as the scope, nature, and utilization of the present invention, will be apparent to those skilled in the art from the following detailed description.

SUMMARY OF THE INVENTION

A melt processable poly(ester-amide) capable of forming an anisotropic melt phase at a temperature below approximately 400° C. is provided. The poly(ester-amide) consists essentially of the recurring moieties I, II, III, and, optionally, IV wherein:

I is

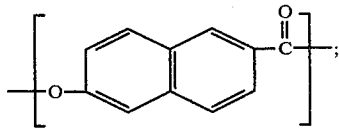

II is

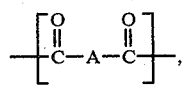

where A is a divalent radical comprising at least one aromatic ring or a divalent trans-1,4-cyclohexylene radical;

III is $-[Y-Ar-Z]-$, where Ar is a divalent radical comprising at least one aromatic ring, Y is O, NH, or NR, and Z is NH or NR, where R is an alkyl group of 1 to 6 carbon atoms or an aryl group; and IV is $-[O-Ar'-O]-$, where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

DESCRIPTION OF THE PREFERRED EMBODIMENTS

The poly(ester-amide) of the present invention consists essentially of at least three recurring moieties which when combined in the poly(ester-amide) have been found to form an atypical, optically anisotropic melt phase. The polymer forms an anisotropic melt phase at a temperature below approximately 400° C. (e.g., below approximately 350° C.). The polymer melting temperatures may be confirmed by the use of a differential scanning calorimeter (i.e., DSC) employing repeat scans at a 20° C. per minute heat-up rate and observing the peak of the DSC melt transition. The poly(ester-amide) commonly exhibits a melting temperature of at least approximately 200° C. and preferably of at least approximately 250° C. as determined by differential scanning calorimetry. The poly(ester-amide) of the present invention may exhibit more than one DSC transition temperature.

Because of its ability to exhibit anisotropic properties (i.e., liquid crystalline properties) in the melt, the poly(ester-amide) readily can form a product having a highly oriented molecular structure upon melt processing. Preferred poly(ester-amide) compositions are capable of undergoing melt processing at a temperature within the range of approximately 250° C. to 350° C., as discussed more fully hereinafter.

The poly(ester-amide) comprises three essential moieties. Moiety I can be termed a 6-oxy-2-naphthoyl moiety and possesses the structural formula:

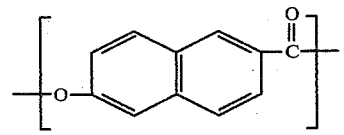

While not specifically illustrated in the structural formula, at least some of the hydrogen atoms present upon the aromatic rings of moiety I may be substituted. Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-7-chloro-2-naphthoic acid, 6-hydroxy-5,7-dichloro-2-naphthoic acid, etc. The presence of ring substitution tends to modify to some degree the physical properties of the resulting polymer (e.g., the polymer may soften at a lower temperature, its impact strength may be improved, and the crystallinity of the solid polymer may be decreased). In a preferred embodiment wherein a poly(ester-amide) of optimum crystallinity in the solid state is desired, no ring substitution is present.

As will be apparent to those skilled in the art, moiety I can be derived from unsubstituted 6-hydroxy-2-naphthoic acid and the derivatives thereof. A convenient laboratory preparation for forming 6-hydroxy-2-naphthoic acid is described in Berichte, Vol. 5, 2835-45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol.

Moiety I comprises approximately 10 to 90 mole percent of the poly(ester-amide). In a preferred embodiment, moiety I is present in a concentration of approximately 40 to 80 mole percent, and most preferably in a concentration of approximately 40 to 60 mole percent.

The second essential moiety (i.e., moiety II) is a dicarboxy moiety of the formula

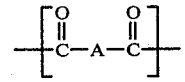

where A is a divalent radical comprising at least one aromatic ring or a divalent trans-1,4-cyclohexylene radical. Moiety II is preferably a dicarboxyaryl moiety, and is more preferably a symmetrical dicarboxyaryl moiety. By "symmetrical" it is meant that the divalent bonds which join the moiety to other moieties in the main polymer chain are symmetrically disposed on one or more rings (e.g., are para to each other or diagonally disposed when present on a naphthalene ring).

The preferred moiety which may serve as a symmetrical dicarboxyaryl moiety in the polyester of the present invention is a terephthaloyl moiety. An example of a non-symmetrical dicarboxyaryl moiety is an isophthaloyl moiety. Although moiety II may be substituted in the same manner as moiety I, highly satisfactory polymers can be formed wherein the dicarboxyaryl moiety is free of ring substitution.

In the case where A is a divalent 1,4-cyclohexylene radical, it has been found that only moiety II units in the trans configuration give rise to a poly(ester-amide) which exhibits anisotropy in the melt phase. This is believed to be due to the disruption and destruction of the rod-like nature of the polymer molecules by the presence of moiety II units in the cis configuration. However, a relatively small amount of moiety II in the cis configuration, as compared with the total amount of polymer, can be tolerated without seriously affecting the anisotropic nature of the polymer in the melt. It is nevertheless preferable to maximize the amount of moiety II in the trans configuration which is present in the polymer. Thus, it is preferred that at least 90 percent (e.g., 95 percent or more) of the 1,4-cyclohexylene radicals be present in the trans configuration.

Trans- and cis-1,4-cyclohexanedicarboxylic acid can be distinguished from one another by such techniques as NMR and IR spectroscopy, as well as by their melting points. A melting point calibration curve is one means by which the relative amounts of trans- and cis-1,4-cyclohexanedicarboxylic acid in a mixture of the isomers can be determined.

Moiety II comprises approximately 5 to 45 mole percent of the poly(ester-amide), and preferably approximately 5 to 30 mole percent (e.g., approximately 20 to 30 mole percent).

Moiety III represents an aromatic monomer which is capable of forming an amide linkage in the polymer. Moiety III possesses the structural formula $-\{Y-Ar-Z\}-$, where Ar is a divalent radical comprising at least one aromatic ring, Y is O, NH, or NR, and Z is NH or NR, where R is a alkyl group of 1 to 6 carbon atoms or an aryl group. R is preferably a straight-chain alkyl group of 1 to 6 carbon atoms and is more preferably a methyl group. Examples of monomers from which moiety III is derived include p-aminophenol, p-N-methylaminophenol, p-phenylenediamine, N-methyl-p-phenylenediamine, N,N'-dimethyl-p-phenylenediamine, m-aminophenol, 3-methyl-4-aminophenol, 2-chloro-4-aminophenol, 4-amino-1-naphthol, 4-amino-4'-hydroxy-diphenyl, 4-amino-4'-hydroxydiphenyl ether, 4-amino-4'-hydroxydiphenyl methane, 4-amino-4'-hydroxydiphenyl ethane, 4-amino-4'-hydroxydiphenyl sulfone, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, and 4,4'-diaminodiphenoxyethane.

Again, although moiety III can be substituted, it is preferably free of ring substitution.

Moiety III comprises approximatey 5 to 45 mole percent of the poly(ester-amide). In a preferred embodiment, moiety III is present in a concentration of approximately 5 to 30 mole percent.

In addition to the three essential moieties described above, the poly(ester-amide) may further comprise an additional moiety (moiety IV). Moiety IV can be termed a dioxyaryl moiety and has the formula $-\{O-Ar'-O\}-$ where Ar' is a divalent radical comprising at least one aromatic ring. Moiety IV preferably is symmetrical in the sense that the divalent bonds which join the moiety to other moieties in the main polymer chain are symmetrically disposed on one or more aromatic rings (e.g., are para to each other or diagonally disposed when present on a naphthalene ring). Preferred moieties which may serve as a symmetrical dioxyaryl moiety in the poly(ester-amide) of the present invention include:

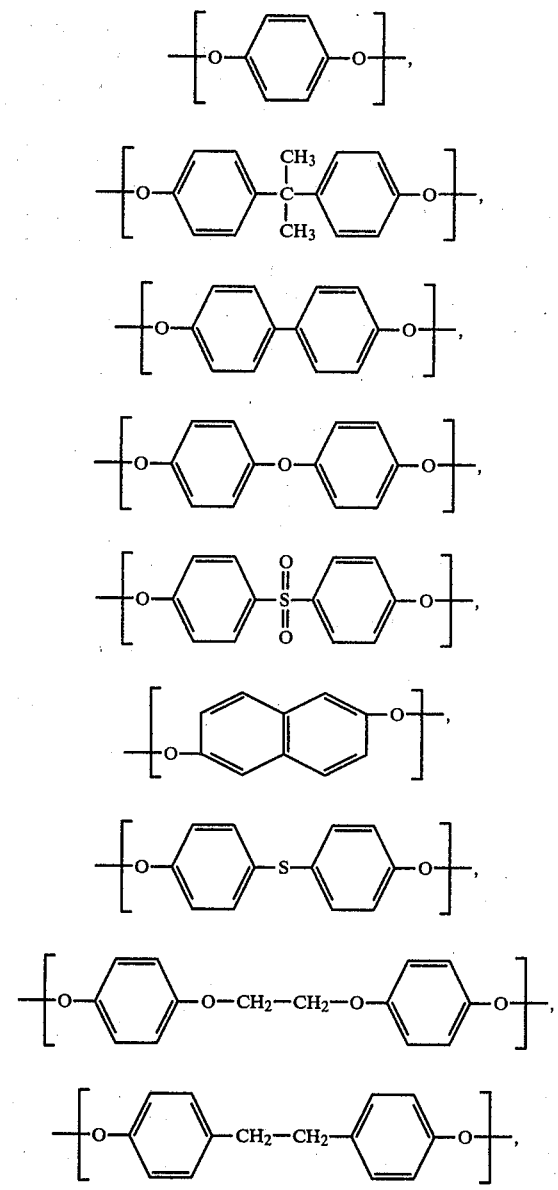

and mixtures of the foregoing. Highly satisfactory polymers can be formed wherein the dioxyaryl moiety is free of ring substitution.

A particularly preferred dioxyaryl moiety is:

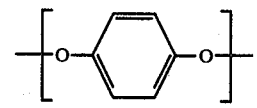

which readily may be derived from hydroquinone. Representative examples of ring substituted compounds from which moiety IV can be derived include methylhydroquinone, chlorohydroquinone, bromohydroquinone, phenylhydroquinone, etc. An example of a nonsymmetrical dioxyaryl moiety is that derived from resorcinol.

Moiety IV comprises approximately 0 to 40 mole percent of the poly(ester-amide), preferably approximately 0 to 25 mole percent, and most preferably approximately 0 to 15 mole percent.

The substituents, if present, on each of the moieties described above are selected from the group consisting of an alkyl group of 1 to 4 carbon atoms, an alkoxy group of 1 to 4 carbon atoms, halogen, phenyl, and mixtures of the foregoing.

Other ester-forming moieties (e.g., dicarboxy, dioxy, or hydroxycarboxy units) other than those previously discussed additionally may be included in the poly(ester-amide) of the present invention in a minor concentration so long as such moieties do not adversely influence the desired anisotropic melt phase exhibited by the poly(ester-amide) heretofore defined and do not raise the melting point of the resulting polymer.

As will be apparent to those skilled in the art, the total molar quantity of amide-forming units and dioxy units, if present, and the total molar quantity of dicarboxy units present within the poly(ester-amide) will be substantially equal. That is, the molar quantity of moiety II and the total molar quantity of moieties III and IV commonly are substantially equal. The various moieties upon polymer formation will tend to be present in a random configuration.

It is further apparent to those of ordinary skill in the art that the total molar concentration, in mole percent, of moieties II, III, and IV in the polymer is determined by subtracting the molar concentration of moiety I from 100 mole percent.

The poly(ester-amide) of the present invention commonly exhibits

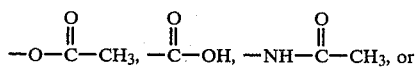

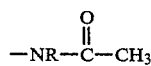

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenyl ester

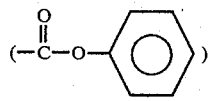

and methylester

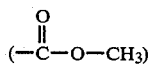

optionally may be included at the end of the polymer chains. The polymer also may be oxidatively crosslinked to at least some degree, if desired, by heating in an oxygen-containing atmosphere (e.g., in air) while in bulk form or as a previously shaped article at a temperature below its melting temperature for a limited period of time (e.g., for a few minutes).

The poly(ester-amide) of the present invention tends to be substantially insoluble in all common solvents, such as hexafluoroisopropanol and o-chlorophenol, and accordingly is not susceptible to solution processing. It can surprisingly be readily processed by common melt processing techniques as discussed hereafter. Most compositions are soluble to some degree in pentafluorophenol.

The poly(ester-amide) of the present invention commonly exhibits a weight average molecular weight of about 5,000 to about 50,000, and preferably about 10,000 to 30,000, e.g., about 15,000 to 17,500. Such molecular weight may be determined by standard techniques not involving the solutioning of the polymer, e.g., by end group determination via infrared spectroscopy on compression molded films. Alternatively, light scattering techniques in a pentafluorophenol solution may be employed to determine the molecular weight.

The poly(ester-amide) of the present invention is capable of undergoing melt processing at a temperature within the range of approximately 200° C. to 400° C. Preferably, the polymer is melt processed at a temperature within the range of approximately 250° C. to 350° C. and more preferably within the range of approximately 270° C. to 330° C.

The melting temperature (Tm) of the poly(ester-amide) of the present invention may vary widely with the composition of the poly(ester-amide). For example, a poly(ester-amide) prepared from 6-hydroxy-2-naphthoic acid (HNA), terephthalic acid, and p-aminophenol exhibits a melting temperature of approximately 360° C. at 80 mole percent HNA. The melting temperature drops to a minimum, for the particular poly(ester-amide), of approximately 276° C. at approximately 66 mole percent HNA and then increases again to approximately 326° C. at 50 mole percent HNA.

The poly(ester-amide) prior to heat treatment additionally commonly exhibits an inherent viscosity (i.e., I.V.) of at least approximately 1.0 dl./g., and preferably at least approximately 2.0 dl./g. (e.g., approximately 3.0 to 8.0 dl./g.) when dissolved in a concentration of 0.1 percent by weight in pentafluorophenol at 60° C.

The poly(ester-amide) of the present invention commonly may be considered crystalline in the sense that fibers melt extruded therefrom exhibit X-ray diffraction patterns using Ni-filtered CuK α radiation and flat plate cameras characteristic of polymeric crystalline materials. In those embodiments wherein ring substitution is present as previously described or wherein certain aryl diols, such as 2,2-bis[4-hydroxyphenyl]propane, are present, the polyesters may be substantially less crystalline in the solid phase and exhibit diffraction patterns typical of oriented amorphous fibers. In spite of the crystallinity commonly observed, the poly(ester-amide) of the present invention nevertheless may be easily melt processed in all instances.

The poly(ester-amide) of the present invention is readily tractable and forms an anisotropic melt phase whereby an atypical degree of order is manifest in the molten polymer. The improved tractability of the present poly(ester-amide) is due, at least in part, to the presence of moiety I, i.e., the 6-oxy-2-naphthoyl moiety. It has been observed that the tractability of the polymer is a function of the molar concentration of moiety I in the polymer.

The subject poly(ester-amide) readily forms liquid crystals in the melt phase. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40× with the sample on a Leitz hot stage and under a nitrogen atmosphere. The polymer melt is optically anisotropic, i.e., it transmits light when examined between crossed polarizers. Light is transmitted when the sample is optically anisotropic even in the static state.

The poly(ester-amide) of the present invention may be formed by a variety of techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, amine groups, etc. The organic monomer compounds may be reacted in the absence of a heat-exchange fluid via a melt acidolysis procedure. They accordingly, may be heated initially to form a melt solution of the reactants with the reaction continuing as solid polymer particles are formed and suspended therein. A vacuum may be applied to facilitate removal of volatiles formed during the final stage of the condensation (e.g., acetic acid or water). Such a technique is disclosed in European Patent Application No. 79301276.6 (Publication No. 0 007 715), which is herein incorporated by reference.

In commonly assigned U.S. Pat. No. 4,067,852 of Gordon W. Calundann, entitled "Melt Processing Thermotropic Wholly Aromatic Polyester Containing Polyoxybenzoyl Units" is described a slurry polymerization process which, although directed to the production of wholly aromatic polyesters, may be employed to form the poly(ester-amide) of the present invention. In that process, the solid product is suspended in a heat exchange medium. The disclosure of this patent is herein incorporated by reference.

When employing either the melt acidolysis procedure or the slurry procedure of U.S. Pat. No. 4,067,852, the organic monomer reactants from which the 6-oxy-2-naphthoyl moiety (i.e., moiety I), the amide-forming moiety (i.e., moiety III), and the optional dioxyaryl moiety (i.e., moiety IV), are derived may be initially provided in a modified form whereby the usual hydroxyl groups of these monomers are esterified (i.e., they are provided as acyl esters). For instance, lower acyl esters of 6-hydroxy-2-naphthoic acid, p-aminophenol, and hydroquinone, wherein the hydroxy groups are esterified, may be provided as reactants. The lower acyl groups preferably have from about 2 to about 4 carbon atoms. Preferably, the acetate esters of the organic compounds which form moieties I, III, and IV are provided. In addition, the amine group of moiety III may be provided as a lower acyl amide. Accordingly, particularly preferred reactants for the condensation reaction are 6-acetoxy-2-naphthoic acid, p-acetoxyacetanilide, and hydroquinone diacetate.

Representative catalysts which optionally may be employed in either the melt acidolysis procedure or in the procedure of U.S. Pat. No. 4,067,852 include alkyl tin oxide (e.g., dibutyl tin oxide), diaryl tin oxide, alkyl tin acids, acyl esters of tin, titanium dioxide, alkoxy titanium silicates, titanium alkoxides, alkali and alkanline earth metal salts of carboxylic acids (e.g., sodium acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.12 percent by weight.

The molecular weight of a previously formed polyester may be further increased via a solid state polymerization procedure wherein the particulate polymer is heated in a flowing inert gaseous atmosphere (e.g., in a flowing nitrogen atmosphere) at a temperature approximately 20° C. below the melting temperature of the polymer for 10 to 12 hours.

The poly(ester-amide) of the present invention readily can be melt processed to form a variety of shaped articles, e.g., molded three-dimensional articles, fibers, films, tapes, etc. The poly(ester-amide) of the present invention is suited for molding applications and may be molded via standard injection molding techniques commonly utilized when forming molded articles. It is not essential that more severe injection molding conditions (e.g., higher temperatures, compression molding, impact molding, or plasma spraying techniques) be utilized. Fibers or films may be melt extruded.

A molding compound may be formed from the poly(ester-amide) of the present invention which incorporates approximately 1 to 60 percent by weight of a solid filler (e.g., talc) and/or reinforcing agent (e.g., glass fibers).

The poly(ester-amide) also may be employed as a coating material which is applied as a powder or from a liquid dispersion.

When forming fibers and films, the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material, the spinneret selected may contain one and preferably a plurality of extrusion orifices. For instance, a standard conical spinneret, such as those commonly used in the melt spinning of poly(ethylene terephthalate), containing 1 to 2000 holes (e.g., 6 to 1500 holes) having a diameter of about 1 to 60 mils (e.g., 5 to 40 mils) may be utilized. Yarns of about 20 to 200 continuous filaments are commonly formed. The melt-spinnable poly(ester-amide) is supplied to the extrusion orifice at a temperature above its melting point, e.g., a temperature of about 270° C. to 330° C. in preferred embodiments.

Subsequent to extrusion through the shaped orifice, the resulting filamentary material or film is passed in the direction of its length through a solidification or quench zone wherein the molten filamentary material or film is transformed into a solid filamentary material or film. The resulting fibers commonly have a denier per filament of about 2 to 40, and preferably a denier per filament of about 3 to 5.

The resulting filamentary material or film optionally may be subjected to a thermal treatment whereby its physical properties are further enhanced. The tenacity of the fiber or film generally is increased by such thermal treatment. More specifically, the fibers or films preferably may be thermally treated in an inert atmosphere (e.g., nitrogen, argon, helium) or alternatively in a flowing oxygen-containing atmosphere (e.g., air) with or without stress at a temperature below the polymer melting point until the desired property enhancement is achieved. Thermal treatment times commonly range from a few minutes to several days. Generally, as the product is thermally treated, its melting temperature progressively is raised. The temperature of the atmosphere may be staged or continuously increased during the thermal treatment or held at a constant level. For instance, the product may be heated at 250° C. for one hour, at 260° C. for one hour, and at 270° C. for one hour. Alternatively, the product may be heated at about 10° C. to 20° C. below the temperature at which it melts for about 45 hours. Optimal heat treatment conditions will vary with the specific composition of the poly(ester-amide) and with the process history of the product.

The as-spun fibers formed from the poly(ester-amide) of the present invention are fully oriented and exhibit highly satisfactory physical properties which render them suitable for use in high performance applications. The as-spun fibers commonly exhibit an average single filament tenacity of at least 1 grams per denier (e.g., about 3 to 10 grams per denier) and an average single filament tensile modulus of at least about 200 grams per denier (e.g., about 300 to 800 grams per denier) and exhibit an extraordinary dimensional stability at elevated temperature (e.g., at temperatures of about 150° to 200° C.). Following thermal treatment (i.e., annealing), the fibers commonly exhibit an average single filament tenacity of at least 5 grams per denier (e.g., 15 to 40 grams per denier). Such properties enable the fibers to be used with particular advantage as tire cords and in other industrial applications, such as conveyor belts, hose, rope, cabling, resin reinforcement, etc. Films formed of the polyester of the present invention may be used as strapping tape, cable wrap, magnetic tape, electric motor dielectric film, etc. The fibers and films exhibit an inherent resistance to burning.

It is anticipated that the poly(ester-amide) compositions of the present invention will exhibit improved adhesion, improved fatigue resistance, and increased transverse strength over known polymers, such as wholly aromatic polyesters.

The following Examples are presented as specific illustrations of the claimed invention. It should be understood, however, that the invention is not limited to the specific details set forth in the Examples.

EXAMPLE 1

This Example illustrates the preparation of a poly(ester-amide) from 6-hydroxy-2-naphthoic acid, terephthalic acid, p-aminophenol, and hydroquinone (or derivatives thereof) in the molar ratio 60:20:10:10.

A 300 ml. 3-neck polymer flask was fitted with a sealed glass paddle stirrer, a gas inlet, and a distillation head and condenser. Into the flask were placed 69 g. (0.3 mole) of 6-acetoxy-2-naphthoic acid, 16.6 g. (0.10 mole) of terephthalic acid, 9.7 g. (0.050 mole) of p-acetoxyacetanilide, and 9.8 g. (0.051 mole) of hydroquinone diacetate. 0.2 g. of sodium acetate was added as a catalyst. The flask was evacuated and flushed with nitrogen 3 times. The flask was heated in an oil bath to 250° C. under a slow stream of nitrogen gas. The contents melted to an opaque slurry and agitation was begun. Acetic acid began to distill over and was collected in a graduated cylinder. After 45 minutes at 250° C., 16 ml. of acetic acid had been collected. The temperature was then raised to 280° C. The melt was an opaque pale tan color. Heating continued at 280° C. for another 45 minutes, by which time 25 ml. of acetic acid had been collected (87% of the theoretical yield). At one stage, the melt became very foamy, but gradually, as the melt became more viscous, the foaming decreased. The temperature was then raised to 320° C. Foaming initially set in but gradually disappeared, as before, to give a smooth creamy opaque melt. Some white sublimate began to form. After a total of 45 minutes at 320° C., 27 ml. of acetic acid (94% of the theoretical yield) had been collected.

Vacuum was then gradually applied and the melt was held at 0.4 mm. for 45 minutes while the temperature was slowly raised to 340° C. Foaming again started but gradually died down. At the end of the heating cycle, the vacuum was released with nitrogen, and the flask was allowed to cool under an inert atmosphere. The polymer formed an opaque viscous melt, pale tan in color, from which long, stiff, strong fibers could be drawn having a "woody", fibrous texture.

When cool, the flask was broken, and the lump of polymer was freed from broken glass, ground in a Wiley mill, and extracted for two hours with acetone in a Soxhlet apparatus to remove traces of monomer, shaft sealing oil, etc.

The polymer exhibited an inherent viscosity of 6.12 dl./g. when measured at a concentration of 0.1 weight/volume percent in pentafluorophenol at 60° C. The polymer exhibited double melting temperature peaks at 275° C. and 281° C. when measured by differential scanning calorimetry.

The powdered polymer was melt-spun as a single filament through a 0.007 inch hole at a throughput rate of 0.14 g./min. and was wound up at 314 m./min. The spin temperature was 330° C. The pale cream fibers produced exhibited the following single filament as-spun properties:

| Tenacity | 12.1 g./d. |
|---|---|
| Extension | 2.3% |
| Initial Modulus | 696 g./d. |
| Denier | 4.2 |

A sample of yarn was heated in a relaxed state in a slow stream of nitrogen at 290° C. for eight hours. The heat treated yarn exhibited the following properties:

| Tenacity | 23.4 g./d. |
|---|---|
| Extension | 4.3% |
| Initial Modulus | 652 g./d. |

EXAMPLE 2

This Example illustrates the preparation of a poly(ester-amide) from 6-hydroxy-2-naphthoic acid, terephthalic acid, and p-aminophenol (or derivatives thereof) in the ratio 60:20:20.

In the manner described in Example 1, a flask was charged with 69.0 g. (0.30 mole) of 6-acetoxy-2-naphthoic acid, 16.6 g. (0.10 mole) of terephthalic acid, and 19.5 g. (0.101 mole) of p-acetoxyacetanilide. 0.02 g. of sodium acetate was added as a catalyst.

The mixture was purged with nitrogen and polymerized in an oil bath as in Example 1. After 45 minutes at 250° C., 16 ml. of acetic acid (56% of the theoretical yield) had been collected. After 45 minutes at 280° C., a total of 24 ml. of acetic acid (84% of the theoretical yield) had distilled. The melt was then heated at 320° C. for 25 minutes, by which time 27 ml. of acetic acid (94% of the theoretical yield) had been evolved, and the opaque tan melt was quite viscous. Vacuum (20 mm.)

was applied slowly and held for 12 minutes at 320° C. The pressure was then reduced to 0.3 mm. for 18 minutes at 340° C. Long stiff fibers could be pulled from the melt.

The polymer was isolated, ground, and extracted as in Example 1. The polymer exhibited an inherent viscosity of 4.24 dl./g., and had a melting temperature (a single DSC peak) at 280° C.

The polymer was melt-spun as a single filament through a 0.007 inch hole at 314° C. at a throughput of 0.14 g./min. and was wound up at 144 m./min. The fiber exhibited the following as-spun, single filament properties:

| | |
|---|---|
| Tenacity | 9.3 g./d. |
| Extension | 2.0% |
| Initial Modulus | 619 g./d. |
| Denier | 8.8 |

A sample was heat treated in a relaxed state at 300° C. in a nitrogen atmosphere for 4 hours. The heat treated sample exhibited the following properties:

| | |
|---|---|
| Tenacity | 29.2 g./d. |
| Extension | 6.6% |
| Initial Modulus | 580 g./d. |

EXAMPLE 3

This Example illustrates the preparation of a poly(ester-amide) from 6-hydroxy-2-naphthoic acid, terephthalic acid, and p-aminophenol (or derivatives thereof) in the ratio 50:25:25.

The polymer was prepared in the manner described in Example 1. The flask was charged with 57.5 g. (0.25 mole) of 6-acetoxy-2-naphthoic acid, 21.0 g. (0.126 mole) of terephthalic acid, and 24.5 g. (0.127 mole) of p-acetoxyacetanilide. 0.02 g. of sodium acetate was added as a catalyst.

The polymerization was conducted as in Example 1 using the following heating schedule: 45 minutes at 250° C., 45 minutes at 280° C., 25 minutes at 320° C. A total of 26 ml. of acetic acid (91% of the theoretical yield) was collected. The polymerization was completed under vacuum (0.2 mm.) at 320°-340° C. for 30 minutes.

The polymer was isolated, ground, and extracted as described in Example 1. The polymer exhibited an I.V. of 5.14 dl./g., and the DSC measurement showed double melting temperature peaks at 325° C. (major peak) and 362° C.

The polymer was melt-spun at 360° C. using a single 0.007 inch hole at a throughput of 0.42 g./min. and a take-up speed of 436 m./min. The fibers exhibited the following as-spun, single filament properties:

| | |
|---|---|
| Tenacity | 10.3 g./d. |
| Extension | 2.2% |
| Initial Modulus | 624 g./d. |
| Denier | 9.4 |

EXAMPLE 4

This Example illustrates the preparation of a poly(ester-amide) from 6-hydroxy-2-naphthoic acid, terephthalic acid, p-phenylene diamine, and hydroquinone (or derivatives thereof) in the ratio 60:20:5:15.

The polymer was prepared in the manner described in Example 1. The flask was charged with 69.07 g. (0.3 mole) of 6-acetoxy-2-naphthoic acid, 16.61 g. (0.1 mole) of terephthalic acid, 4.85 g (0.02525 mole) of N,N'-1,4-phenylenebisacetamide, and 14.71 g. (0.07575 mole) of hydroquinone diacetate. 0.01 g. of sodium acetate was added as a catalyst. After evacuation and purging of the reaction vessel as in Example 1, the vessel was warmed to 250° C. using an external oil bath to initiate polymerization. Polymerization was conducted between 250° C. and 340° C. for 135 minutes under a nitrogen atmosphere and at 340° C. and 0.35 Torr for 30 minutes. Upon completion of polymerization, light yellow fibers of moderate strength were pulled from the polymerization vessel as the paddle stirrer was removed. The vessel and its contents were cooled to room temperature. The polymer was recovered, ground, and extracted essentially as in Example 1. The polymer exhibited an I.V. of 4.12 dl./g., and the DSC measurement showed an endothermic transition at 273° C.

After drying at about 130° C. and 1 Torr for one day, the polymer was melt spun through a 0.007 inch single hole jet within the temperature range of 314° C. to 346° C., at a throughput within the range of 0.14 to 0.55 g./min., and at take-up speeds as high as 1,162 m./min.

A filament spun at a spinning temperature of 330° C., a throughput of 0.52 g./min., and a filament wind-up speed of 1,162 m./min. exhibited the following as-spun, single filament properties:

| | |
|---|---|
| Tenacity | 5.98 g./d. |
| Extension | 1.5% |
| Initial Modulus | 543 g./d. |

A sample of this monofilament was heat treated in a stream of nitrogen at 285° C. for 15 hours to give the following properties:

| | |
|---|---|
| Tenacity | 16 g./d. |
| Extension | 3.45% |
| Initial Modulus | 545 g./d. |

EXAMPLES 5-11

These Examples illustrate the preparation of a poly(ester-amide) from 6-hydroxy-2-naphthoic acid, dicarboxylic acid, and p-aminophenol (or derivatives thereof). In Examples 5-7, the dicarboxylic acid was terephthalic acid. In Examples 8 and 9, the dicarboxylic acid was 1,2-bis(4-carboxyphenoxy) ethane. In Examples 10 and 11, the dicarboxylic acid was 1,4-cyclohexanedicarboxylic acid (95% trans isomer).

The polymers were prepared in substantially the same manner as described in Example 1. The final polymerization temperature was usually 340° C., except in the case of Example 11 where 320° C. was found to be adequate.

Properties and compositions are set out on Table I.

TABLE I

| Example | Composition | Molar Ratio | $T_m$ (°C.) | $T_g$ (°C.) | I.V. (dl./g.) |
|---|---|---|---|---|---|
| 5 | HNA/TA/AAA | 70:15:15 | 293 | 105 | 5.89 |
| 6 | HNA/TA/AAA | 80:10:10 | 360 | 95 | 4.27 |
| 7 | HNA/TA/AAA | 65:17.5:17.5 | 278 | 93 | 3.92 |
| 8 | HNA/CPE/AAA | 60:20:20 | 256 | — | 3.35 |
| 9 | HNA/CPE/AAA | 50:25:25 | 256 | — | 2.62 |
| 10 | HNA/CHDA/AAA | 60:20:20 | 185 | — | 6.47 |

TABLE I-continued

| Example | Composition | Molar Ratio | $T_m$ (°C.) | $T_g$ (°C.) | I.V. (dl./g.) |
|---|---|---|---|---|---|
| 11 | HNA/CHDA/AAA | 40:30:30 | 270 | — | 4.80 |

HNA = 6-acetoxy-2-naphthoic acid
TA = terephthalic acid
CPE = 1,2-bis(4-carboxyphenoxy)ethane
CHDA = 1,4-cyclohexanedicarboxylic acid (95% trans isomer)
AAA = p-acetoxyacetanilide The polymer samples were ground to a coarse powder, extracted with acetone, dried, and then melt-spun through a single 0.007 inch hole. Spinning conditions and fiber properties are set out in Table II.

TABLE II

| Example | Spin Temp. (°C.) | Throughput (g./min.) | Take-Up Speed (m./min.) | Denier | Tenacity (g./d.) | Extension (percent) | Initial Modulus (g./d.) |
|---|---|---|---|---|---|---|---|
| 5 | 361 | 0.14 | 140 | 9.2 | 8.4 | 2.1 | 565 |
| 6 | 374 | 0.42 | 289 | 11.2 | 7.6 | 1.9 | 510 |
| 7 | 330 | 0.14 | 186 | 6.5 | 9.5 | 2.0 | 643 |
| 8 | 330 | 0.14 | 107 | 14.2 | 7.2 | 2.3 | 443 |
| 9 | 300 | 0.14 | 36 | 36.5 | 7.5 | 2.7 | 400 |
| 10 | 370 | 0.07 | 16 | 41.4 | 2.8 | 1.3 | 240 |
| 11 | 331 | 0.14 | 325 | 4.1 | 7.0 | 2.5 | 350 |

EXAMPLE 12

This Example illustrates the preparation of a poly(ester-amide) from 6-hydroxy-2-naphthoic acid, terephthalic acid, p-N-methylaminophenol (or derivatives thereof) in the ratio 60:20:20.

The polymer was prepared in the manner described in Example 1. The flask was charged with 69.0 g. (0.3 mole) of 6-acetoxy-2-naphthoic acid, 16.6 g. (0.1 mole) of terephthalic acid, and 21.0 g. (0.101 mole) of p-acetoxy-(N-methyl)-acetanilide. The preparation of p-acetoxy-(N-methyl)-acetanilide was accomplished by acetylating p-methylaminophenol with acetic anhydride in pyridine and crystallizing the product from alcohol. The product exhibited a melting point of 98°–100° C. The components defined above were polymerized in the presence of 0.01 g. of sodium acetate as catalyst.

The flask was purged thoroughly with dry nitrogen and heated for 45 minutes at 250° C., 45 minutes at 280° C., 30 minutes at 300° C., 30 minutes at 320° C., and 30 minutes at 340° C. The total yield of acetic acid was 27.0 ml. (94.4% of the theoretical yield). Polymerization of the opaque, viscous, pale yellow melt was completed under vacuum (0.5 Torr) at 340° C. for 30 minutes. After cooling under nitrogen, the flask was broken, and the polymer was recovered. The lumps of polymer were ground in a Wiley mill to a coarse powder which was dried in an oven.

The polymer exhibited an I.V. of 1.82 dl./g., and the DSC measurement showed a melting temperature peak at 265° C.

The polymer was melt-spun at 392° C. through a single 0.007 inch hole at a throughput of 0.42 g./min. and was wound up at 75 m./min. The resulting fiber exhibited the following as-spun, single filament properties:

| | |
|---|---|
| Tenacity | 4.5 g./d. |
| Extension | 1.5% |
| Initial Modulus | 367 g./d. |
| Denier | 58.3 |

EXAMPLE 13

This Example illustrates the preparation of a poly(ester-amide) from 6-hydroxy-2-naphthoic acid, terephthalic acid, p-N-methylaminophenol, and hydroquinone (or derivatives thereof) in the ratio 60:20:10:10.

The polymerization was conducted in precisely the same manner as described in Example 12. The polymer melt was an opalescent yellow-brown color, and strong, stiff fibers having a "woody" fracture could be pulled from the melt.

The polymer exhibited an I.V. of 1.37 dl./g., and the DSC measurement showed a melting temperature of 280° C. The polymer was melt-spun at 331° C. through a single 0.007 inch hole at a throughput of 0.14 g./min. and a take-up speed of 319 m./min. The resulting filaments exhibited the following as-spun properties:

| | |
|---|---|
| Tenacity | 8.3 g./d. |
| Extension | 2% |
| Initial Modulus | 506 g./d. |
| Denier | 4.9 |

EXAMPLE 14

This Example illustrates the preparation of a poly(ester-amide) from 6-hydroxy-2-naphthoic acid, terephthalic acid, and p-aminophenol (or derivatives thereof) in the molar ratio 60:20:20.

A 2,000 ml. 3-neck polymer flask was fitted with a sealed glass paddle stirrer, a gas inlet, and a distillation head. A condenser and receiver were fitted to the still head. Into the flask were placed 414 g. (1.8 moles) of 6-acetoxy-2-naphthoic acid, 99.6 g. (0.6 mole) of terephthalic acid, and 117.0 g. (0.61 mole) of p-acetoxyacetanilide. 0.15 g. of anhydrous sodium acetate was added as a catalyst. The flask was evacuated and flushed with argon 3 times. The flask was heated under a low stream of argon in an oil bath to 250° C. The contents melted to an opaque slurry and agitation was begun. Acetic acid began to distill over and was collected in a graduated cylinder. After 45 minutes at 250° C., 91.0 ml. (53% theoretical yield) had been collected. The temperature was then raised to 280° C. at which temperature the melt was heated for another 45 minutes, by which time 150 ml. of acetic acid had been collected (87% of the theoretical yield). The temperature was then raised to 300° C. for thirty minutes, 320° C. for thirty minutes, and finally, 340° C. for ten minutes. The final yield of acetic acid was 169 ml. (98.5% of the theoretical yield). The melt was opaque, dark tan colored, and fairly viscous at this point.

Vacuum (0.5 mm.) was slowly applied to minimize the existence of bubbling and foaming of the melt. The melt was held at this pressure for about 20 minutes until the melt became quiescent again. Heating and stirring were then continued under vacuum at 340° C. The melt became very viscous and the stirrer motor began to labor. After a total of 45 minutes under vacuum, the system was brought to atmospheric pressure with argon, and the stirrer was pulled from the melt while flushing with a vigorous stream of argon in order to minimize surface oxidation. Long, strong, stiff fibers were pulled out with the stirrer blade. After cooling under argon, the plug of polymer was removed by breaking the flask and removing broken glass from the polymer. Total recovery of polymer was 397.0 g. (88% of the theoretical yield). The plug was sawed up into small chunks and ground in a Wiley mill into a coarse powder.

The polymer exhibited an inherent viscosity of 6.3 dl./g. when measured in a concentration of 0.1 weight-/volume percent in pentafluorophenol at 60° C. The polymer exhibited a glass transition temperature of 110° C. and a melting temperature of 280° C. when measured by a differential scanning calorimetry.

The polymer was dried for 48 hours at 105° C. under vacuum and was then molded on an Arburg molding machine into test bars under the following conditions:

| Screw Barrel Temperature | 330° C. |
|---|---|
| Mold Temperature | 32° C. |
| Cycle Times | |
| Injection | 10 seconds |
| Cooling | 20 seconds |
| Delay | 3 seconds |
| Total | 33 seconds |
| Screw R.P.M. | 220 |
| Injection Pressure | 8,000 p.s.i. |

The molded test bars were tested for tensile strength and modulus according to ASTM D638, for flexural properties in accordance with ASTM D790 and for notched Izod impact strength according to ASTM D256.

The following values were obtained (average of 5 values):

| Tensile Break | 36,000 p.s.i. |
|---|---|
| Tensile Modulus | $4.4 \times 10^6$ p.s.i. |
| Elongation | 1.2% |
| Flexural Break | 32,000 p.s.i. |
| Flexural Modulus | $2.2 \times 10^6$ p.s.i. |
| Notched Izod impact strength | 5.8 ft.-lbs. |

These values indicate a remarkable combination of strength and extreme stiffness combined with excellent impact properties.

Although the invention has been described with preferred embodiments, it is to be understood that variations and modifications may be employed as will be apparent to those of ordinary skill in the art. Such variations and modifications are to be considered within the purview and scope of the claims appended hereto.

We claim:

1. A melt processable poly(ester-amide) capable of forming an anisotropic melt phase at a temperature below approximately 400° C. consisting essentially of recurring moieties I, II, III, and, optionally, IV wherein:

I is

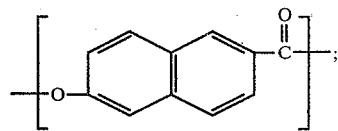

II is

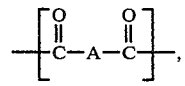

where A is a divalent radical comprising at least one aromatic ring or a divalent trans-1,4-cyclohexylene radical;

III is $-\!\!\left[\text{Y}\!-\!\text{Ar}\!-\!\text{Z}\right]\!\!-$, where Ar is a divalent radical comprising at least one aromatic ring, Y is O, NH, or NR, and Z is NH or NR, where R is an alkyl group of 1 to 6 carbon atoms or an aryl group; and IV is $-\!\!\left[\text{O}\!-\!\text{Ar}'\!-\!\text{O}\right]\!\!-$, where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

2. A melt processable poly(ester-amide) according to claim 1 which is capable of forming an anisotropic melt phase at a temperature below approximately 350° C.

3. A melt processable poly(ester-amide) according to claim 2 wherein the molar concentration of moiety II is approximately equal to the total molar concentration of moieties III and IV.

4. A melt processable poly(ester-amide) according to claim 1 which comprises approximately 40 to 80 mole percent of moiety I, approximately 5 to 30 mole percent of moiety II, approximately 5 to 30 mole percent of moiety III, and approximately 0 to 25 mole percent of moiety IV.

5. A molding compound comprising the melt processable poly(ester-amide) of claim 1 which incorporates approximately 1 to 60 percent by weight of a solid filler and/or reinforcing agent.

6. A molded article comprising the melt processable poly(ester-amide) of claim 1.

7. A fiber which has been melt spun from the poly(ester-amide) of claim 1.

8. A film which has been melt extruded from the poly(ester-amide) of claim 1.

9. A melt processable poly(ester-amide) capable of forming an anisotropic melt phase at a temperature below approximately 350° C. consisting essentially of recurring moieties I, II, III, and, optionally, IV wherein:

I is

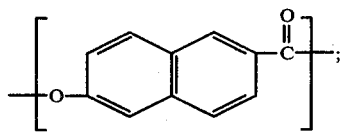

II is

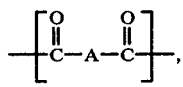

where A is a divalent radical comprising at least one aromatic ring or a divalent trans-1,4-cyclohexylene radical;

III is $-[Y-Ar-Z]-$, where Ar is a divalent radical comprising at least one aromatic ring, Y is O, NH, or NR, and Z is NH or NR, where R is an alkyl group of 1 to 6 carbon atoms or an aryl group; and IV is $-[O-Ar'-O]-$, where Ar' is a divalent radical comprising at least one aromatic ring, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein said poly(ester-amide) comprises approximately 40 to 80 mole percent of moiety I, approximately 5 to 30 mole percent of moiety II, approximately 5 to 30 mole percent of moiety III, and approximately 0 to 25 mole percent of moiety IV.

10. A melt processable poly(ester-amide) according to claim 9 wherein the molar concentration of moiety II is approximately equal to the total molar concentration of moieties III and IV.

11. A melt processable poly(ester-amide) according to claim 10 which comprises approximately 40 to 60 mole percent of moiety I, approximately 20 to 30 mole percent of moiety II, approximately 5 to 30 mole percent of moiety III, and approximately 0 to 15 mole percent of moiety IV.

12. A melt processable poly(ester-amide) according to claim 9 wherein each of the moieties of said poly(ester-amide) is free of ring substitution.

13. A melt processable poly(ester-amide) according to claim 9 wherein said A radical of moiety II is a divalent radical comprising at least one aromatic ring.

14. A molding compound comprising the melt processable poly(ester-amide) of claim 9 which incorporates approximately 1 to 60 percent by weight of a solid filler and/or reinforcing agent.

15. A molded article comprising the melt processable poly(ester-amide) of claim 9.

16. A fiber which has been melt spun from the melt processable poly(ester-amide) of claim 9.

17. A film which has been melt extruded from the melt processable poly(ester-amide) of claim 9.

* * * * *